United States Patent [19]

Turner et al.

[11] Patent Number: 4,743,423

[45] Date of Patent: May 10, 1988

[54] NEUTRON SHIELD PANEL ARRANGEMENT FOR A NUCLEAR REACTOR PRESSURE VESSEL

[75] Inventors: Robert L. Turner, Reston, Va.; Kimchinh Tran, Pittsburgh, Pa.; Stephan L. Abbott, Monroeville, Pa.; Leonard R. Golick, Trafford, Pa.; David E. Boyle, Kiski Township, Armstrong County, Pa.; Theodore A. Meyer, Penn Township, Westmoreland County, Pa.

[73] Assignee: Westinghouse Electric Corp., Pittsburgh, Pa.

[21] Appl. No.: 655,953

[22] Filed: Sep. 28, 1984

[51] Int. Cl.$^4$ .................................. G21C 11/00
[52] U.S. Cl. ..................... 376/287; 250/515.1; 250/518.1; 252/478; 376/272; 376/288
[58] Field of Search ............ 376/287, 288, 289, 294, 376/272; 250/515.1, 518.1, 519.1; 252/478

[56] References Cited

U.S. PATENT DOCUMENTS

| 3,449,208 | 6/1969 | Balent et al. | 376/288 |
| 3,720,751 | 3/1973 | Van Houten | 252/625 |
| 3,781,189 | 12/1973 | Kasberg | 252/478 |
| 3,720,752 | 3/1973 | Van Houten | 252/625 |
| 3,868,302 | 2/1975 | Singleton | 376/289 |
| 4,039,842 | 8/1977 | Mollon | 250/518.1 |
| 4,123,392 | 10/1978 | Hall et al. | 252/478 |

FOREIGN PATENT DOCUMENTS 2629737  1/1978  Fed. Rep. of Germany ...... 376/287
0119781  9/1984  European Pat. Office .

Primary Examiner—Deborah L. Kyle
Assistant Examiner—Richard W. Wendtland
Attorney, Agent, or Firm—D. C. Abeles

[57] ABSTRACT

A shield panel for use in a nuclear reactor including a reactor vessel susceptible to embrittlement when bombarded with high energy neutrons and a nuclear reactor core mounted within the reactor vessel, the reactor vessel having a longitudinal axis and an inner surface surrounding the longitudinal axis, and the nuclear core emitting high energy neutrons which impinge on the inner surface of the reactor vessel. The shield panel includes a canister which contains a completely enclosed interior space and which is mountable between the inner surface of the reactor vessel and the nuclear core in a region wherein the reactor vessel is susceptible to a higher rate of embrittlement than the remaining portion of the vessel when bombarded with high energy neutrons emitted from the nuclear core, and a substance consisting essentially of a heavy metal and hydrogen filling the interior space of the canister.

27 Claims, 2 Drawing Sheets

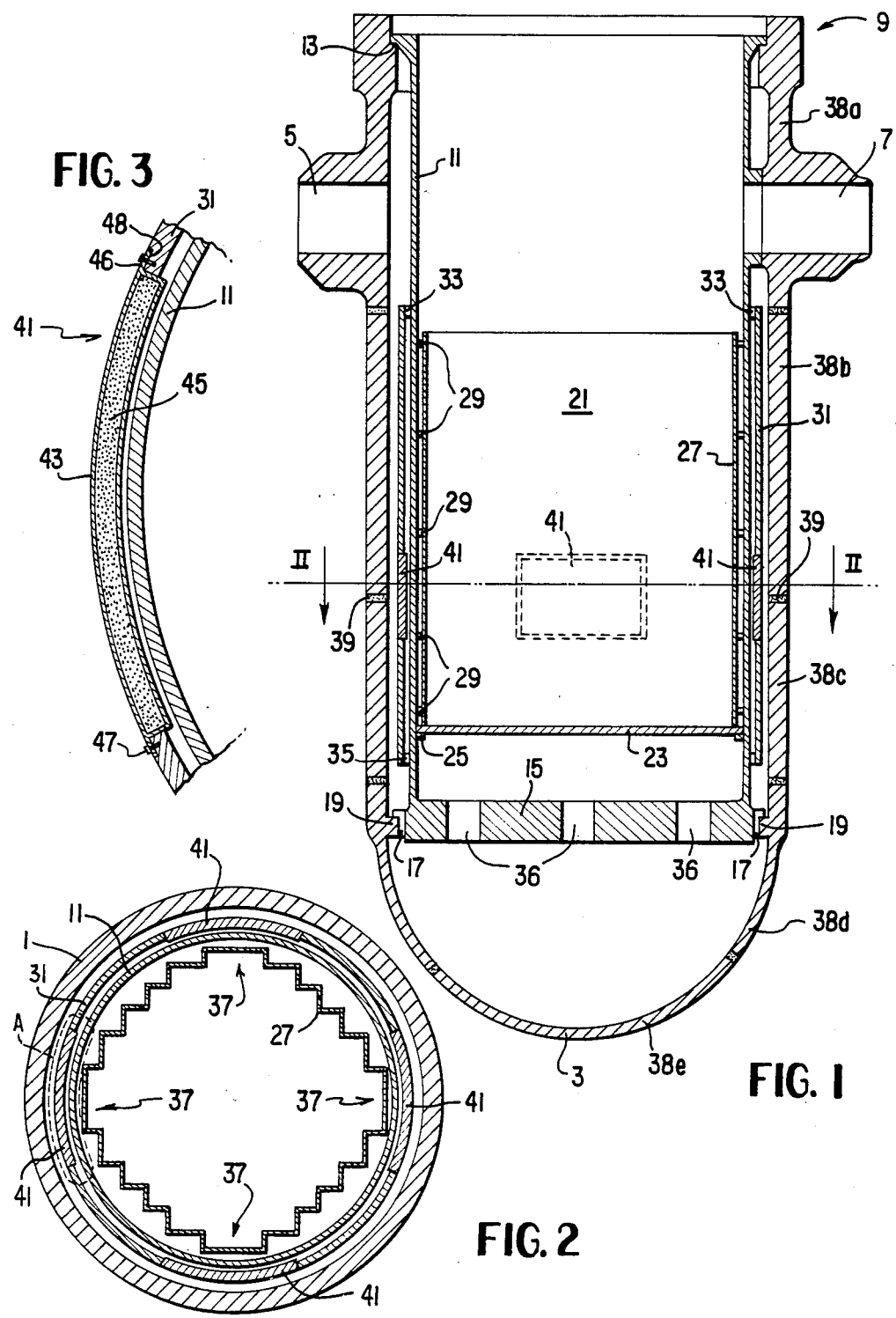

NEUTRON SHIELD PANEL ARRANGEMENT FOR A NUCLEAR REACTOR PRESSURE VESSEL

BACKGROUND OF THE INVENTION

1. Field of the Invention

The invention relates to a neutron shielding arrangement for a nuclear reactor, and more particularly to an arrangement employing a neutron shield panel to shield a selected region of a nuclear reactor vessel against the impingement of high energy neutrons emanating from the nuclear reactor core.

2. Description of the Prior Art

In pressurized water-moderated and boiling water nuclear reactors, both of which are used for producing steam to drive a steam turbine, a nuclear reactor core and other control apparatus, commonly referred to as reactor internals, are disposed in a metal vessel filled with water. Fission takes place within the reactor core whereby the energy of the fission products is transmitted to the water. In a pressurized water-moderated reactor the heated water is pumped from the reactor vessel through a heat exchanger in which it transfers its heat energy to another circuit of water to form steam to drive a turbine. In the boiling water reactor the energy of the fission products is transmitted to the water in the reactor vessel to form steam to drive a turbine. In both types of reactor it has been found that neutron flux imposed on the vessel from the reactor core results in the material of the vessel becoming embrittled. That is, with prolonged exposure to high energy neutrons the fracture toughness of the vessel is reduced and could ultimately result in fracturing of the vessel should the condition be allowed to continue.

Several design techniques have been utilized in the past to reduce the radiation exposure of the vessel. For example, in pressurized water reactors manufacturers have employed a steel thermal shield to reduce the radiation exposure of the vessel. In one such design the core-barrel, which surrounds and supports the reactor core, it itself surrounded by a cylindrical steel wall which is 2 to 3 inches thick and which is situated approximately an equal distance from the inner surface of the pressure vessel and the outer surface of the core-barrel. In an alternative design disclosed in U.S. Pat. No. 3,868,302, recognizing that the neutron flux level impinging on the inner surface of a reactor vessel varies markedly in the circumferential direction, the thickness of the core-barrel is selectively increased in those regions where a high flux exists. If the thickness of the core-barrel is increased in the high flux regions by an amount corresponding to the thickness of the cylindrical thermal shield first mentioned above, the maximum radiation exposure of the reactor vessel is essentially the same as the level that would result with a separate cylindrical thermal shield.

The foregoing thermal shield designs satisfy standards for allowable fluence (the number of neutrons impinging upon a unit area) over the operating life of certain nuclear reactors. However, it has been found that the chemical composition of the reactor vessel in some nuclear reactors causes the vessel to have a high rate of embrittlement even with such shielding. Specifically, it has been found that when the steel forgings or plates which comprise the vessel contain significant residual amounts of copper and nickel (approximately 1% combined), the rate of embrittlement of the vessel is significantly increased over vessels which do not contain such impurities. Additionally, any welds which join the steel forgings or plates together to form the vessel and which contain significant residual amounts of copper and nickel are also subject to increased embrittlement rates.

The known thermal shielding designs discussed above may not have sufficient neutron fluence reduction capability with respect to vessels and welds therein which contain significant residual amounts of copper and nickel to prevent the steel of such vessels and/or the welds therein from exceeding proposed Nuclear Regulatory Commission screening criteria regarding allowable embrittlement within the projected operating life of the reactor. The known thermal shield designs can reduce the fluence by approximately 20% to 40%, depending on the particular shield and nuclear reactor. It has been determined, however, that vessels and/or welds in such vessels containing significant residual amounts of copper and nickel and located in the high fluence regions of the reactor may require shielding which reduces the fluence by a factor of 4.0 or more.

Fuel mnagement techniques are known by which the fuel assemblies within the core can be arranged in a manner to minimize the neutrons flowing out of the core. Fuel management techniques have been employed to reduce the fluence by as much as a factor of 2. However, the combination of fuel management techniques and known shielding designs still may not reduce the fluence enough to keep the rate of embrittlement of a reactor vessel containing significant residual amounts of copper and nickel within acceptable limits.

SUMMARY OF THE INVENTION

It is an object of the invention to provide increased neutron shielding for a selected portion of a nuclear reactor vessel which is subject to a high rate of embrittlement when exposed to high energy neutron flux.

The above and other objects are accomplished according to the invention wherein a shield panel is provided for use in a nuclear reactor including a reactor vessel susceptible to embrittlement when bombarded with high energy neutrons, and a nuclear core mounted within the reactor vessel, the reactor vessel having a longitudinal axis and an inner surface surrounding the longitudinal axis, and the nuclear core emitting high energy neutrons which impinge on the inner surface of the reactor vessel. The shield panel includes a canister which contains a completely enclosed interior space and which is mountable between the inner surface of the reactor vessel and the nuclear core in a region wherein the reactor vessel is susceptible to a higher rate of embrittlement than the remaining portion of the vessel when bombarded with high energy neutrons emitted from the nuclear core, and a substance consisting essentially of a heavy metal and hydrogen filling the interior space of the canister.

In a preferred embodiment of the invention the shield panel comprises a canister which is made of stainless steel or Inconel and which encloses a cavity filled with titanium hydride and/or zirconium hydride. The canister may be mounted between the core-barrel and the vessel in a variety of ways, depending upon the existing shielding structure of a particular reactor. For example, if the existing shielding structure is in the form of a cylindrical steel wall spaced from the core-barrel, the canister is preferably mounted in a window cut out of the cylindrical shield. It is also possible to mount the canister to the inside surface of the cylindrical shield or to the outside surface of the core-barrel. In the event the existing shield is in the form of individual plates attached to the core-barrel in each of the high fluence regions, the canister may be mounted in a window cut out of the steel plate at the appropriate location.

In another preferred embodiment the shield panel comprises a solid block of stainless steel or Inconel mounted in a window cut out of a cylindrical shield surrounding the core-barrel, the window being opposite the region of the vessel susceptible to a higher rate of embrittlement.

The shield panels according to the invention are particularly suitable for existing nuclear reactors in which it has been determined that selected portions of the vessel are subject to increased rates of embrittlement when bombarded by high energy neutrons and wherein current shielding structures and/or known fuel management techniques do not sufficiently reduce the fluence so as to prevent the selected portions of the vessel from exceeding acceptable levels of embrittlement.

BRIEF DESCRIPTION OF THE DRAWINGS

FIG. 1 is a side sectional view of a nuclear reactor vessel employing a shield panel according to the invention.

FIG. 2 is a sectional view of FIG. 1 along line II—II.

FIG. 3 is an enlarged view of the region enclosed by the dotted line denoted A in FIG. 2.

DESCRIPTION OF THE PREFERRED EMBODIMENTS

Figure 4:
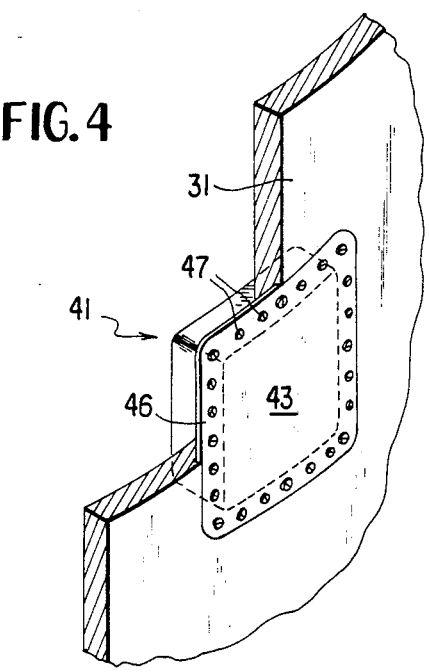
FIG. 4 is a perspective view, partially cut away, showing the shield panel of FIG. 1.

Referring to the drawings, there is shown in FIG. 1 an elongated, generally cylindrically-shaped nuclear reactor vessel 1 of conventional design for use in a pressurized water-moderated nuclear reactor system. Vessel 1 has the usual hemispherical bottom 3, at least one cooling water inlet nozzle 5 and at least one cooling water outlet nozzle 7. Vessel 1 forms a tight pressurized container when sealed at its open end 9 by a head assembly (not shown). A cylindrical core-barrel 11 is suspended from an inwardly extending flange 13 of vessel 1. Core-barrel 11 includes a bottom forging 15 which has a plurality of projections 17 disposed about its circumference for engaging a corresponding number of key members 19 for stabilizing the position of core-barrel 11 in the circumferential and radial directions.

A nuclear reactor core 21 containing a plurality of fuel assemblies (not shown) is disposed within vessel 1 and rests on a lower core plate 23 which is connected to the inner wall of core-barrel 11 by connecting elements 25. Nuclear core 21 is contained and surrounded by a baffle structure 27 which has a shape corresponding to the generally rectangular configuration of the core as shown more clearly in FIG. 2. Baffle structure 27 is connected to core-barrel 11 by a plurality of separator plates 29. A cylindrical thermal shield 31 is disposed between the inner surface of vessel 1 and the outer surface of core-barrel 11 and is attached to core-barrel 11 by connecting members 33 and 35. As is well known, core-barrel 11 and thermal shield 31 are generally both made of stainless steel and vessel 1 is made of a low carbon steel clad on its inner surface with a layer (not shown) of stainless steel.

During operation cooling water enters vessel 1 at inlet nozzle 5 and flows downwardly through the annulus formed by the outer surface of core-barrel 11 and the inner surface of vessel 1. Cooling water at the bottom of vessel 1 rises through a plurality of openings 36 in bottom forging 15 and up through the fuel assemblies (not shown) via a plurality of openings (not shown) in lower core plate 23. The pressurized and heated water subsequently passes through exit nozzle 7 where it is transmitted to a steam generator (not shown) for driving a turbine (not shown).

The nuclear fuel in the core 21 emits neutrons which project outwardly toward vessel 1. The neutron flux emanating from the core varies in the circumferential direction. In one typical reactor design, the highest flux levels are in the vicinity of the corners of the generally rectangular configuration of the core, such corners being identified by reference numeral 37 in FIG. 2. In another typical design (not shown) the highest flux levels are shifted by 45° from the corners 37 shown in FIG. 2.

It has long been known that the steel forgings or plates of a nuclear reactor vessel become embrittled by exposure to high energy neutrons. For this reason, thermal shields such as cylindrical thermal shield 31 have been used to reduce the neutron flux impinging upon the vessel 1. It has been found, however, that when the steel comprising the vessel or the composition of a weld in the vessel includes significant residual mounts of copper and nickel, such known shielding means is insufficient, particularly in the high fluence regions. Without additional shielding such portions of the vessel could become so embrittled as to result in increased susceptibility to crack growth which may require repair by time consuming and expensive processes.

It thus becomes necessary to increase the shielding in the high fluence regions when it is determined that a weld passing through such a high fluence region contains significant residual amounts of copper and nickel or when the steel itself of the vessel contains such residual elements. The present invention solves this problem by the provision of a shield panel which can be used in addition to or in place of the thermal shield in the immediate vicinity of the area of the vessel which is subject to an increased rate of embrittlement due to its inclusion of significant residual amounts of copper and nickel.

Referring again to FIG. 1, reactor vessel 1 is shown to be comprised of a plurality of steel shell courses 38a–38e which are joined together by welds, such as girth weld 39. Girth weld 39 is located between the upper and lower ends of the nuclear core and thus passes through the four high fluence regions in the vicinity of corners 37 (see FIG. 2). For the purposes of this description it is assumed that girth weld 39 contains significant residual amounts of copper and nickel and is thus subject to an increased rate of embrittlement when exposed to high energy neutrons. As discussed above, the known thermal shield 31 does not provide sufficient shielding for such a weld. In accordance with the present invention a shield panel 41 is mounted opposite girth weld 39 in each of the locations where the girth weld passes through a high fluence region. In the embodiment of the invention illustrated in FIGS. 1 to 4, each shield panel 41 is inserted in a window formed in thermal shield 31 by cutting out a portion of thermal shield 31 at the appropriate location opposite girth weld 39 in each off the high fluence regions. Each window has dimensions corresponding to those of the shield panel 41 which is to be inserted.

Referring to FIG. 3, according to a preferred embodiment of the invention, shield panel 41 comprises a canister having an outer wall 43 made of stainless steel or Inconel which fully encloses a cavity 45 filled with a heavy metal hydride. Preferably, the fill material comprises titanium hydride ($TiH_2$) which has been found to provide the highest degree of shielding. Zerconium hydride may also be used for the fill material either by itself or in combination with titanium hydride. In general, combinations of moderately heavy or heavy elements and hydrogen have been found to effectively slow down fast neutrons in the entire energy region. The heavy elements are effective for slowing down neutrons up to 1 Mev as a result of inelastic scattering collisions. However, in the neighborhood of 1 Mev, slowing down neutrons by heavy elements becomes less effective than the moderation of neutrons by a light element, such as hydrogen, which can moderate neutrons effectively by elastic collisions.

Since the effective shielding depends on the balance of heavy elements and hydrogen, it follows that the stoichiometric composition of the metal hydride plays an important role in achieving optimum shielding capability. For example, titanium can theoretically be saturated with hydrogen to produce a hydrogen/titanium ratio equal to 2. In the commercial environment, however, various known manufacturing processes yield H/Ti ratios near 1.8. One such manufacturing process is known as the Van Houten process and is described in U.S. Pat. Nos. 3,720,751 and 3,720,752.

The sensitivity of the shield factor to the change of the stoichiometric composition of titanium hydride is reflected in the table below, the shield factor being the factor by which the neutron flux is reduced with the use of the shield panel. As can be seen, the shield performance of titanium hydride diminishes with the decrease of hydrogen content.

The density of the metal hydride also plays a role in the shielding factor. For example, titanium hydride comes in the form of powder or brittle fragments, depending on the manufacturing process. The range of densities varies between 85% and 100% of the theoretical density. The shield factor decreases as the density is lowered as shown in the table below. The shielding performance of lower density titanium hydride is less because the rate of slowing-down-scattering-interactions decreases proportionately with the density.

The thickness of the titanium hydride also affects the shielding factor as shown in the table below.

In the table below, the shielding factors include the shielding effects of a ½ inch stainless steel canister wall, the total thickness of the front and back walls of the canister being one inch.

| TITANIUM HYDRIDE SHIELD FACTORS AS A FUNCTION OF DENSITY, STOICHIOMETRIC COMPOSITION, AND THICKNESS | | | |
| --- | --- | --- | --- |
| Shield Factor | (%) Density | TiHx | TiHx Thickness (Inch) |
| 1.89 | 1.0 | $TiH_2$ | 2.69 |
| 2.20 | 1.0 | $TiH_2$ | 3.00 |
| 3.00 | 1.0 | $TiH_2$ | 3.75 |
| 1.26 | .85 | $TiH_{1.8}$ | 2.69 |
| 1.47 | .85 | $TiH_{1.8}$ | 3.00 |
| 2.00 | .85 | $TiH_{1.8}$ | 3.75 |

The azimuthal and longitudinal dimensions of the canister as well as the thickness of the canister wall and the thickness of titanium hydride must be designed for each particular application, taking into account the dimensions of the area of the vessel which is to be shielded, as well as the desired shielding factor. As an example, in one case the shield panel design included an azimuthal span of 50°, a height of 30 inches, a canister wall thickness of 0.5 inch, and a thickness for the titanium hydride of 3.75 inches. The shielding factor for a shield panel of the foregoing dimensions varies between 2.0 and 2.9, depending upon a stoichiometric ratio of hydrogen to titanium between 1.8 and 2, and a variation in the density of the titanium hydride between 85% and 100% of the theoretical density.

Referring to FIG. 3, which shows an enlargement of the dotted-line area A in FIG. 2, and more particularly to FIG. 4, it can be seen that shield panel 41 has a flange 46 extending around its periphery and is machined for receiving a plurality of bolts 47 for attaching the shield panel to thermal shield 31. Preferably, thermal shield 31 is provided with a counter-sink 48 so that the outer surface of shield panel 41 is flush with the outer surface of thermal shield 31 when installed.

Figure 5:
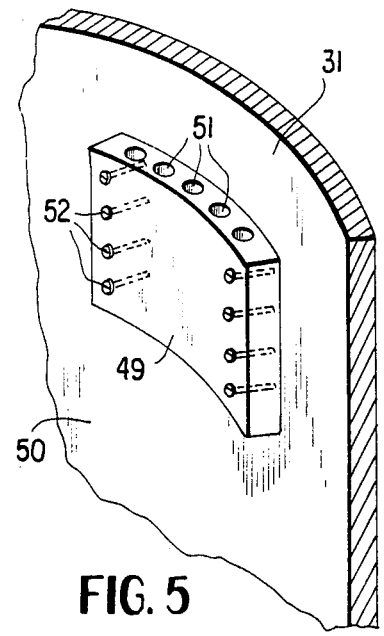
FIG. 5 is a perspective view showing an alternative embodiment for mounting a shield panel in accordance with the invention.

FIG. 5 shows an alternative shield panel arrangement in accordance with the principles of the invention. In FIG. 5 a shield panel 49 comprising a stainless steel or Inconel canister filled with a metal hydride is connected to the inner surface 50 of cylindrical thermal shield 31 via bolts 52. Shield panel 49 has similar shielding characteristics as shield panel 41 in FIGS. 1–4. Because the space between cylindrical shield 31 and core-barrel 11 is limited, as shown in FIGS. 1 and 2, shield panel 49 may be provided with a plurality of longitudinal flow holes 51 to permit the passage of cooling water flowing in the annulus between core-barrel 11 and vessel 1.

Figure 6:
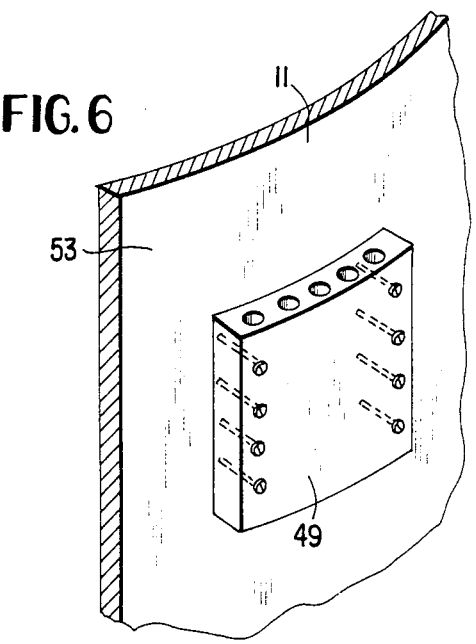
FIG. 6 is a perspective view showing a further embodiment for mounting a shield panel according to the invention.

Instead of mounting shield panel 49 on the inner surface of the cylindrical shield 31, it is also possible to mount shield panel 49 on the outside surface 53 of core-barrel 11 as shown in FIG. 6.

Figure 7:
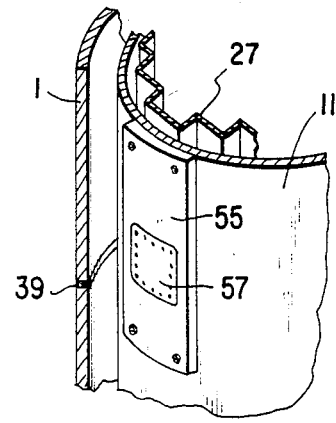
FIG. 7 is a partial perspective view partially cut away of a nuclear reactor vessel and its internals showing yet another embodiment of a shielding arrangement employing a shield panel according to the invention.

FIG. 7 illustrates an application of the shield panel constructed in accordance with the invention with a segmented thermal shield as disclosed in U.S. Pat. No. 3,868,302. A segmented thermal shield performs a function similar to that of the cylindrical thermal shield. However, rather than completely surrounding the core-barrel, a plurality of thermal shield segments are mounted to the outer surface of the core-barrel in each of the high fluence regions of the core. FIG. 7 shows one such thermal shield segment 55 mounted to core-barrel 11. Thermal shield segment 55 has an arc in the azimuthal direction corresponding to the azimuthal dimension of the high fluence region. The longitudinal dimension of thermal shield segment 55 is approximately the length of the nuclear core since each high fluence region extends along the entire length of the core. Shield panel 57 is constructed in a manner similar to that of shield panel 41 in FIGS. 1-4 and is thus mounted in a window cut out of thermal shield segment 55 by a plurality of bolts disposed about the outer peripheral region of panel 57. Reactor vessel 1 in FIG. 7 has a girth weld 39, which as in FIG. 1, is assumed to have residual amounts of nickel and copper and therefore subject to a higher rate of embrittlement. Shield panel 57 is accordingly positioned to be opposite weld 39.

If the steel forgings, plates or longitudinal welds comprising vessel 1 contain nickel and copper so as to render them more subject to embrittlement, the longitudinal dimension of the shield panels illustrated in the drawing figures may be increased as necessary to cover the entire region which is susceptible to increased embrittlement. In some cases the longitudinal dimension of the shield panel may correspond to the longitudinal dimension of the high fluence region which expands the entire length of the core.

The composition of the canister comprising the shield panel in accordance with the invention may also be varied depending upon the shielding requirements of a particular application. For example, it is possible within the principles of the present invention for the shield panel to comprise a solid block of stainless steel or Inconel. While a solid block of stainless steel or Inconel will provide a lower degree of shielding than a canister filled with a metal hydride as discussed above, it may be that in a particular application a solid block of stainless steel or Inconel which has a thickness greater than the thickness of the cylindrical thermal shield of FIGS. 1 to 4, would provide a sufficient amount of additional shielding so as to reduce the fluence to acceptable levels. In this aspect of the invention a solid block of stainless steel or Inconel may be configured in a manner similar to the shape of shield panel 41 in FIGS. 1 to 4 and be mounted in a window cut out of thermal shield 31 in a similar manner as shown in those figures. Depending on space limitations and the ease of access to the inner surface of the cylindrical shield 31, a solid block of stainless steel or Inconel may be mounted to the inner surface of cylindrical shield 31 in a manner similar to the mounting of shield panel 49 in FIG. 5.

It will be understood that the above description of the present invention is susceptible to various modifications, changes and adaptations, and the same are intended to be comprehended within the meaning and range of equivalents of the appended claims.

We claim:

1. A shield panel for use in a nuclear reactor comprising a reactor vessel susceptible to embrittlement when bombarded with high energy neutrons and a nuclear core mounted within said reactor vessel, said reactor vessel having a longitudinal axis and an inner surface surrounding said longitudinal axis, said nuclear core emitting high energy neutrons which impinge on the inner surface of said reactor vessel, said shield panel comprising:
  a canister containing a completely enclosed interior space, said canister being mountable between the inner surface of said reactor vessel and said nuclear core in a region wherein said reactor vessel is susceptible to a higher rate of embrittlement than the remaining portion of said vessel when bombarded with high energy neutrons emitted from said nuclear core; and
  a substance consisting essentially solely of a heavy metal and hydrogen filling the interior space of said canister.

2. A shield panel according to claim 1, wherein said canister is comprised of one of stainless steel and Inconel.

3. A shield panel according to claim 1, wherein said substance comprises at least one of titanium hydride and zirconium hydride.

4. A nuclear reactor comprising:
  a reactor vessel susceptible to embrittlement when bombarded with high energy neutrons;
  a nuclear core mounted within said reactor vessel, said reactor vessel having a longitudinal axis and an inner surface surrounding said longitudinal axis, said nuclear core emitting high energy neutrons which impinge on the inner surface of said reactor vessel; and
  a shield panel mounted between the inner surface of said reactor vessel and said nuclear core in a region wherein said reactor vessel is susceptible to a higher rate of embrittlement than the remaining portion of said vessel when bombarded with high energy neutrons emitted from said nuclear core, said shield panel comprising a canister containing a completely enclosed interior space an a substance consisting essentially solely of a heavy metal and hydrogen filling the interior space of said canister.

5. A reactor panel according to claim 4, wherein said canister is comprised of one of stainless steel and Inconel.

6. A reactor according to claim 4, wherein said substance comprises at least one of titanium hydride and zirconium hydride.

7. A reactor according to claim 4, and further including a core-barrel surrounding and supporting said nuclear core and wherein said shield panel is mounted between said core-barrel and said vessel.

8. A reactor according to claim 7, wherein said shield panel is attached directly to said core-barrel.

9. A reactor according to claim 7, wherein said nuclear core has opposite ends defining respective planes transverse to said longitudinal axis and further including a steel wall which forms a thermal shield mounted between said core-barrel and said vessel, said steel wall being disposed between said planes and extending in a direction parallel to said longitudinal axis to at least both of said planes, and wherein said shield panel is attached directly to said steel wall.

10. A reactor according to claim 9, wherein said steel wall is spaced from said core-barrel and has an inner surface facing said core-barrel, and said shield panel is attached to the inner surface of said steel wall.

11. A reactor according to claim 9, wherein said steel wall is spaced from said core-barrel and has an opening opposite said region and said shield panel is disposed in said opening.

12. A reactor according to claim 11, wherein said shield panel has a peripheral flange and is connected to said steel wall via said peripheral flange.

13. A reactor according to claim 9, wherein said core-barrel has an outer surface facing said steel wall, said steel wall includes a plurality of spaced apart steel wall segments, each segment being connected to the outer surface of said core barrel, at least one of said segments being located opposite said region and having an opening, and said shield panel is disposed in said opening.

14. A reactor according to claim 4, wherein said region includes at least one of copper and nickel.

15. A reactor according to claim 14, wherein said region comprises at least one of a weld, steel forging and steel plate.

16. In a nuclear reactor including a reactor vessel susceptible to embrittlement when bombarded with high energy neutrons and a nuclear core mounted within the reactor vessel, the nuclear core emitting high energy neutrons which impinge on the reactor vessel, a method for shielding a selected region of the vessel against bombardment from high energy neutrons emanating from the nuclear core comprising:

identifying a region of the reactor vessel which is susceptible to a higher rate of embrittlement than remaining portions of the vessel when bombarded with high energy neutrons emitted from the nuclear core;

providing a shield panel corresponding in size to the identified region and formed of a canister containing a completely enclosed interior space and a substance consisting essentially solely of a heavy metal and hydrogen filling the interior space of such canister; and mounting the shield panel between the reactor vessel and the nuclear core in the identified region of the reactor vessel.

17. A method according to claim 16, wherein said providing step includes forming the canister of one of stainless steel and Inconel.

18. A method according to claim 16, wherein said providing step includes filling the interior space of the canister with one of titanium hydride and zirconium hydride.

19. A method according to claim 16, wherein the reactor vessel includes a core-barrel surrounding and supporting the nuclear core and wherein said mounting step includes mounting the shield panel between the core-barrel and the reactor vessel.

20. A method according to claim 19, wherein said mounting step includes mounting the shield panel directly to the core-barrel.

21. A method according to claim 20, wherein the nuclear reactor includes a steel wall which forms a thermal shield mounted between the core-barrel and the reactor vessel, and wherein said mounting step includes mounting the shield panel directly to the steel wall.

22. A method according to claim 21, wherein the steel wall is spaced from the core-barrel and has an inner surface facing the core-barrel, and wherein said mounting step includes mounting the shield panel to the inner surface of the steel wall.

23. A method according to claim 21, including providing the steel wall with an opening opposite the region of the reactor vessel identified as being susceptible to a higher rate of embrittlement, and wherein said mounting step includes mounting the shield panel to the steel wall so that the shield panel is disposed in such opening.

24. A method according to claim 23, wherein said mounting step includes providing the shield panel with a peripheral flange and connecting the shield panel to the steel wall via the peripheral flange.

25. A method according to claim 21, wherein the core-barrel has an outer surface facing the steel wall, the steel wall includes a plurality of spaced apart steel wall segments, each segment being connected to the outer surface of the core barrel, at least one of the segments being located opposite the region identified as being susceptible to a higher rate of embrittlement; wherein said mounting step includes providing the at least one segment with an opening opposite the identified region and mounting the shield panel to the at least one segment with the shield panel being disposed in the opening.

26. A method according to claim 16, wherein said identifying step includes identifying the region based upon its content of at least one of copper and nickel.

27. A method according to claim 26, wherein the identified region comprises at least one of a weld, steel forging and steel plate.

* * * * *